(12) United States Patent
Sartor et al.

(10) Patent No.: US 9,525,859 B2
(45) Date of Patent: Dec. 20, 2016

(54) REFINEMENT OF USER INTERACTION

(71) Applicant: SONY CORPORATION, Tokyo (JP)

(72) Inventors: Piergiorgio Sartor, Fellbach (DE); Francesco Michielin, Padua (IT)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/419,101

(22) PCT Filed: Aug. 1, 2013

(86) PCT No.: PCT/EP2013/066194
§ 371 (c)(1),
(2) Date: Feb. 2, 2015

(87) PCT Pub. No.: WO2014/023641
PCT Pub. Date: Feb. 13, 2014

(65) Prior Publication Data
US 2015/0201175 A1  Jul. 16, 2015

(30) Foreign Application Priority Data
Aug. 9, 2012 (EP) ..................... 12179890

(51) Int. Cl.
*G06K 9/00* (2006.01)
*H04N 13/00* (2006.01)
(Continued)

(52) U.S. Cl.
CPC ........... *H04N 13/0022* (2013.01); *G06T 5/005* (2013.01); *G06T 7/0085* (2013.01); *G06T 7/2086* (2013.01); *G06T 2207/10024* (2013.01); *G06T 2207/10028* (2013.01); *G06T 2207/20012* (2013.01); *G06T 2207/20096* (2013.01);
(Continued)

(58) Field of Classification Search
USPC ............... 382/100, 103, 106–107, 154, 162, 168,382/173, 181, 194, 199, 232, 254, 276,382/286–291, 305, 312, 285; 345/419; 348/51, 348/46, 222.1
See application file for complete search history.

(56) References Cited

U.S. PATENT DOCUMENTS 7,505,841 B2 * 3/2009 Sun ..................... G06K 9/00362
345/419
7,835,568 B2 * 11/2010 Park ....................... G06T 17/10
382/154
(Continued)

FOREIGN PATENT DOCUMENTS

EP  2 268 047 A2  12/2010
EP  2 268 047 A3  12/2010

OTHER PUBLICATIONS

International Search Report and Written Opinion issued Oct. 18, 2013 in PCT/EP2013/066194 Filed Aug. 1, 2013.
(Continued)

*Primary Examiner* — Seyed Azarian
(74) *Attorney, Agent, or Firm* — Oblon, McClelland, Maier & Neustadt, L.L.P.

(57) ABSTRACT

A method for refining a disparity/motion estimation map of an image at image regions a user has marked, including filtering the image along a mark set by the user, binarizing the filtered image to generate a binarized map of the filtered image, determining a binary step within the binarized map indicating a boundary of an object, and refining the disparity/motion estimation map on the basis of the determined binary step.

19 Claims, 3 Drawing Sheets

(51) Int. Cl.
*G06T 5/00* (2006.01)
*G06T 7/00* (2006.01)
*G06T 7/20* (2006.01)
*G06T 15/00* (2011.01)

(52) U.S. Cl.
CPC ............... *G06T 2207/20104* (2013.01); *G06T 2207/20148* (2013.01); *H04N 2013/0081* (2013.01)

(56) References Cited

U.S. PATENT DOCUMENTS

| | | | |
|---|---|---|---|
| 2005/0140670 A1* | 6/2005 | Wu | G06T 17/20 345/419 |
| 2007/0116334 A1 | 5/2007 | Fidrich et al. | |
| 2009/0295711 A1 | 12/2009 | Nakamura et al. | |
| 2009/0300553 A1 | 12/2009 | Pettigrew et al. | |
| 2010/0157080 A1* | 6/2010 | Kondo | G06T 1/00 348/222.1 |
| 2010/0315488 A1* | 12/2010 | Kim | H04N 13/026 348/46 |
| 2011/0032341 A1* | 2/2011 | Ignatov | H04N 13/0033 348/51 |
| 2013/0215143 A1 | 8/2013 | Pettigrew et al. | |

OTHER PUBLICATIONS

Patrick Vandewalle, et al., "Improving depth maps with limited user input", SPIE—International Society for Optical Engineering, vol. 7524, XP002682580, Jan. 17, 2010, pp. 752414-1 to 752414-9.

Jiawen Chen, et al., "The video mesh: A data structure for image-based three-dimensional video editing", Computational Photography (ICCP), IEEE International Conference, XP031943263, Apr. 8, 2011, 8 Pages.

Yin Li, et al., "Lazy snapping", ACM Transactions on Graphics (TOG), vol. 23, No. 3, XP009099127, Jan. 2004, pp. 303-308.

Anton van den Hengel, et al., "VideoTrace: Rapid interactive scene modelling from video", ACM Transactions on Graphics, vol. 26, No. 3, Article 86, Jul. 2007, pp. 86-1 to 86-5.

Sudipta N. Sinha, et al., "Interactive 3D architectural modeling from unordered photo collections", SIGGRAPH Asia, Dec. 2008, 10 Pages.

Anton Yakubenko, et al., "Image-based 3D reconstruction of generalized box with user sketches", International Conference Graphicon, 2006, 4 Pages.

* cited by examiner

REFINEMENT OF USER INTERACTION

BACKGROUND

Field of the Disclosure

The present disclosure relates to a method for refining a disparity or motion estimation map of an image at image regions a user has marked. The disclosure also relates to a video post processing system for refining a disparity/motion estimation map of an image at image regions a user has marked. Further, the present disclosure relates to a computer program and a non-transitory computer readable recording medium.

Description of Related Art

In many image applications, a disparity estimation map and/or a motion estimation map is required, for example for interpolating intermediate images. In a disparity estimation map each pixel of an image is assigned a value indicating its "depth" in the scene shown in the image. In particular, the disparity estimation map shows the horizontal displacement between a pixel/object in one image and the corresponding pixel/object in the other image of the image pair forming a 3D image. Hence, a disparity map is generated by searching corresponding pixels/objects in both images of a 3D image and calculating the horizontal displacement. This process could also be used for motion estimation with the difference that corresponding pixels/objects are searched in following images and not in a 3D image pair.

It is apparent that the process of generating disparity estimation maps or motion estimation maps is error prone to a certain extent. For example, boundaries of objects could sometimes not be recognized exactly so that the disparity or motion estimation map reflects wrong object boundaries.

In the art there are systems to correct such errors in the disparity/motion estimation maps, for example by marking the correct object boundaries. In such offline video post-processing systems, the user can approximately mark the borders of objects where the disparity map, particularly the values are too imprecise. However, due to certain constraints, the user has to interact as fast as possible so that it is very likely that the user's interaction, namely marking borders of the object, could also be imprecise.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide a method for refining a disparity/motion estimation map which allows the user to precisely mark boundaries/borders of objects which have been incorrectly processed by the system as fast as possible. It is a further object to provide a video post-processing system for refining a disparity/motion estimation map. It is a further object to provide a corresponding computer program for implementing the method for refining a disparity/motion estimation map and a non-transitory computer-readable recording medium for implementing said method.

According to an aspect there is provided a method for refining a disparity/motion estimation map of an image pair at image regions a user has marked, including filtering said image along a mark set by the user, binarizing said filtered image to generate a binarized map of the filtered image determining a binary step within said binarized map indicating a boundary of an object, and refining said disparity map on the basis of the determined binary step.

According to a further aspect there is provided a video post-processing system for refining a disparity/motion estimation map of a image pair at image regions a user has marked, including a disparity/motion estimator receiving a image pair containing a first image and a second image, a user interface adapted to mark regions in the image for disparity/motion refinement, a filter receiving said image pair for filtering said image pair along said marked region, a binarizing unit receiving said filtered image and generating a binarized map, a binary step determining unit receiving said binarized map and determining a binary step within said map, and a disparity/motion estimation map refinement unit adjusting said disparity motion estimation map in correspondence with said determined binary step.

According to still further aspects a computer program comprising program code means for causing a computer to perform the steps of said method disclosed herein, and a non-transitory computer readable recording medium that stores therein a computer program product, which, when executed by a processor, causes the method to be performed are provided.

One of the aspects of the present disclosure is to allow the user to mark boundaries of objects which are imprecise in the estimation map in a fast and easy way and to refine the user's marking in a succeeding step. In other words, the user only has to roughly mark the imprecisely determined object boundary and the system then uses this input to find the precise boundary of the object in an iterative process. The determined precise boundary is then used to refine the disparity or motion estimation map so that the estimation map also reflects the correct object boundary.

In other words, the user can roughly mark objects and the method refines the inevitably imprecise user marks, aligning them to the object boundaries. Preferably the marks are used to iterate a directional filter, and the filtered area is then binarized using for example DRC technique. The binary map defines the object boundaries so that the values in the disparity/motion estimation map can be fitted to the object.

The method therefore post-processes the disparity/motion estimation map with the support from the user input and refines the estimation map to the real object boundaries.

The method according to the present disclosure may be used in many fields of application, like multi-media video processing. A further preferred field of application is the field of medical technology, in particular the field of imaging techniques or medical imaging.

It is to be understood that both the foregoing general description of the disclosure and the following detailed description are exemplary, but are not restrictive, of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
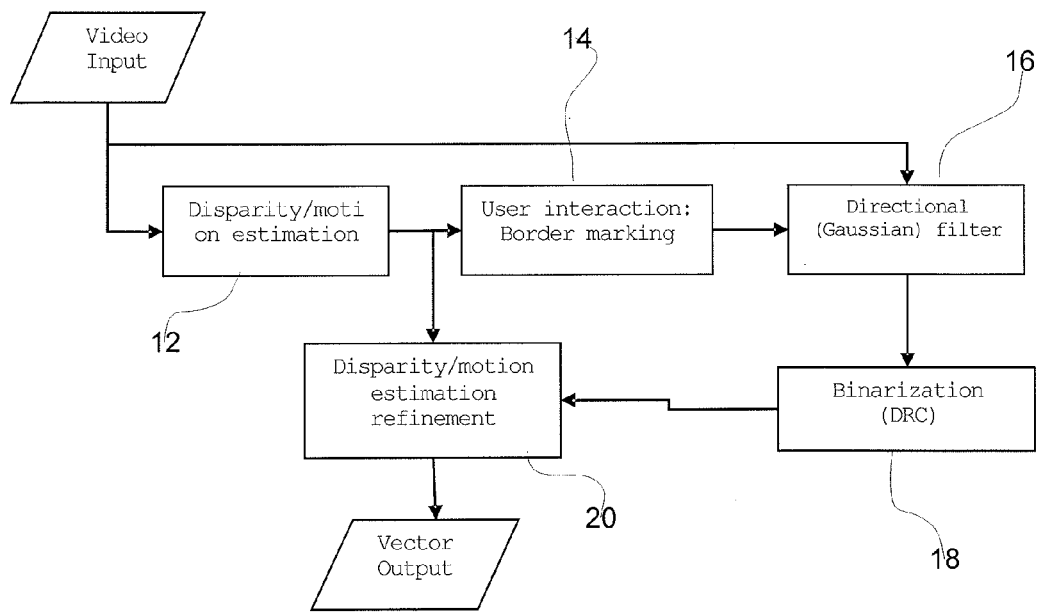
FIG. 1 shows a block diagram illustrating the method for refining a disparity/motion estimation map.

Referring now to the drawings, wherein like reference numerals designate identical or corresponding parts throughout the several views, FIG. 1 shows a block diagram of the main steps of a method for refining a disparity map of a 3D image. Although the following is related to the refinement of a disparity estimation map, it is appreciated that the method is also applicable for a motion estimation map. The only difference between disparity estimation and motion estimation is that disparity estimation is based on a 3D image pair (left image and right image), whereas motion estimation is carried out for two succeeding images. However, both is common to find correspondences between two images, either to estimate disparity or to estimate motion of an object between two images.

Therefore, it is to be noted here that the method described below is also applicable to refine a motion estimation map. Disparity and/or motion estimation maps are used in video processing systems, e.g. medical imaging systems or multimedia video systems.

In a video processing system the 3D images, namely pairs of left and right images are supplied to a disparity estimation circuit which generates a disparity estimation map for the supplied image pair. The process of disparity estimation is known in the art so that it is refrained from describing it in detail. The result of the disparity estimation is a disparity estimation map which could also be considered as a field of vectors, each pixel of an image being assigned a disparity vector. Each vector indicates the position in terms of "depth" of the respective pixel in the image.

The disparity estimation map is required for several post-processing purposes, for example for interpolating images.

In FIG. 1, the step of generating a disparity estimation map is referenced with numeral 12. It is without saying that the result of the disparity estimation map generation might be of high quality but it is unlikely that it is errorless. Therefore, a post-processing system 10 comprises a circuit for correcting or refining the disparity estimation map.

In particular, it is likely that boundaries or borders of objects in the image have not been identified correctly. Therefore, the system 10 gives the option to mark respective borders/boundaries in the image which have not been identified correctly in the disparity estimation map. This user interaction starts a process which analyses the image region around the user's mark as to find or identify the correct border of the object. In other words, the user tries to mark or trace the correct border of the object, however, with a certain amount of inaccuracy. The system then uses the mark as a basis for a process of identifying the correct boundary of the object. On the basis of the correct border, the disparity estimation map is refined.

The process of analyzing the user's mark and identifying the correct border comprises two main steps, which are indicated as directional filtering 16 and binarization 18 in FIG. 1.

The result of the binarization step 18 is used by a disparity estimation refinement step 20 which adjusts the disparity map to the new calculated border. The result of the disparity estimation refinement step 20 is a adjusted or corrected disparity estimation map with improved quality compared to the disparity estimation map after step 12.

Figure 2:
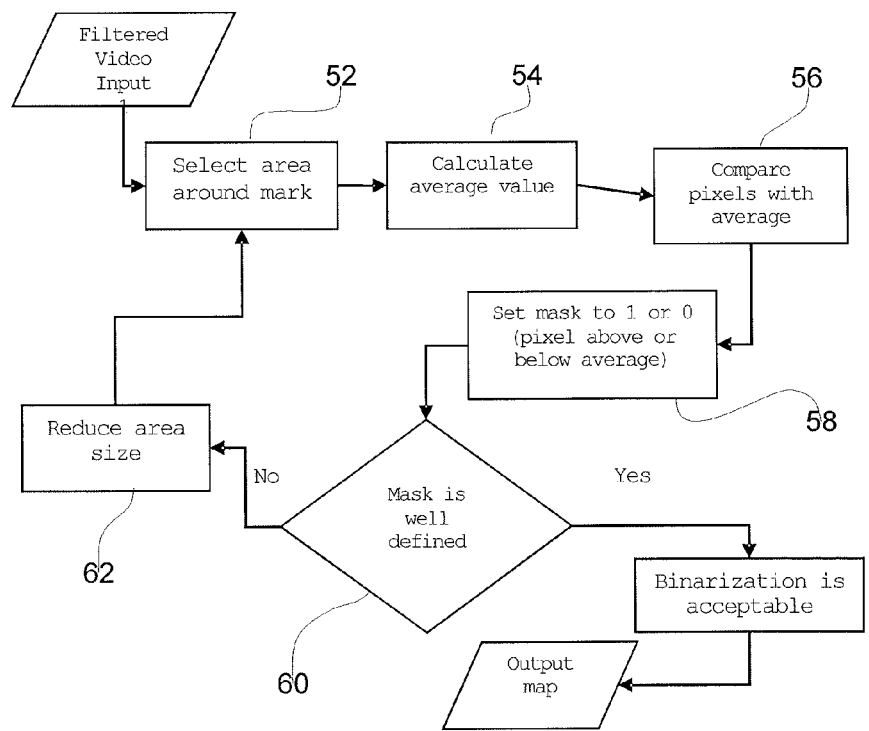
FIG. 2 shows a block diagram of the binarization step.
Figure 3:
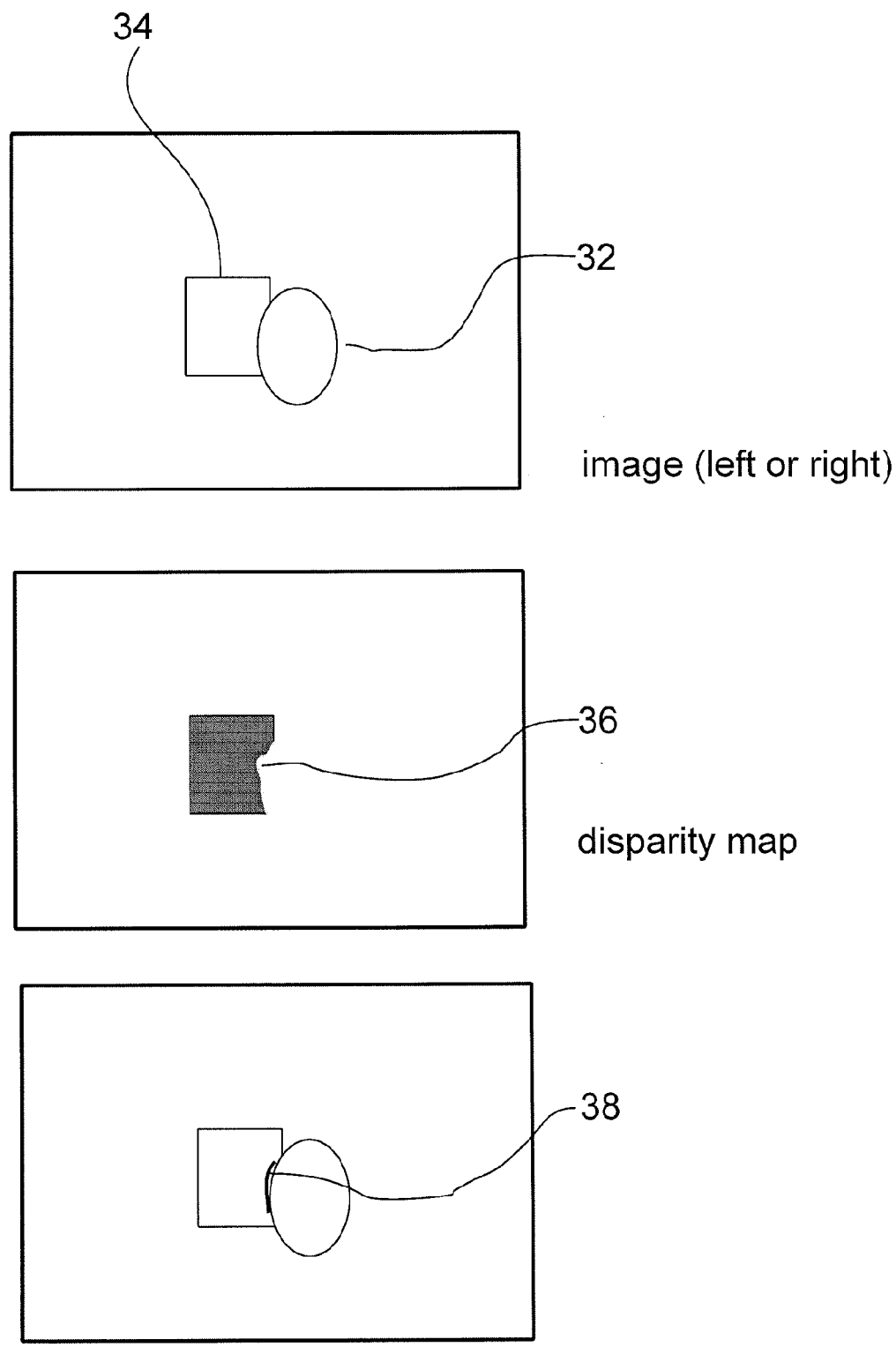
FIG. 3 shows examples of a graphical user interface for marking a region to be refined.

As to illustrate the first steps of the method it is referred to FIGS. 2 and 3.

For illustrating purposes, it is assumed that as video input an image is provided containing two objects, namely a circle 32 and a square 34 (FIG. 3). The circle 32 lies in front of the square 34, and in the captured 3D scene lies closer to the camera as the square 34. Hence, the circle 32 and the square 34 have different depths.

In the generated disparity map which is schematically shown in FIG. 3, the circle 32 is shown in a different color as the square 34 due to their different depths in the captured scene.

However, the boundary of the circle 32 has not been identified correctly by the disparity estimation step. Rather, there is a small protrusion which is indicated by reference numeral 36.

In step 14, the user can mark the correct boundary of the circle 32 by a line which is indicated with reference numeral 38. As it is apparent from FIG. 3, this line 38 does not exactly match the boundary of the circle 32, rather the line has a certain amount of impreciseness.

This imprecise line or mark 38 set by a user, for example by using a touch panel and a stylus as input means, is the basis for the steps 16 and 18, which are now described in more detail.

First, in step 16, the region around the mark 38 is filtered, for example by using a directional filter, more preferably a directional Gaussian filter. The filter uses the direction of the line 38. The filtering is applied rowwise, wherein the shape of the filter changes every row and for every row a direction is associated. By applying the filter, the image region around the mark or line 38 is defused.

Figure 4:
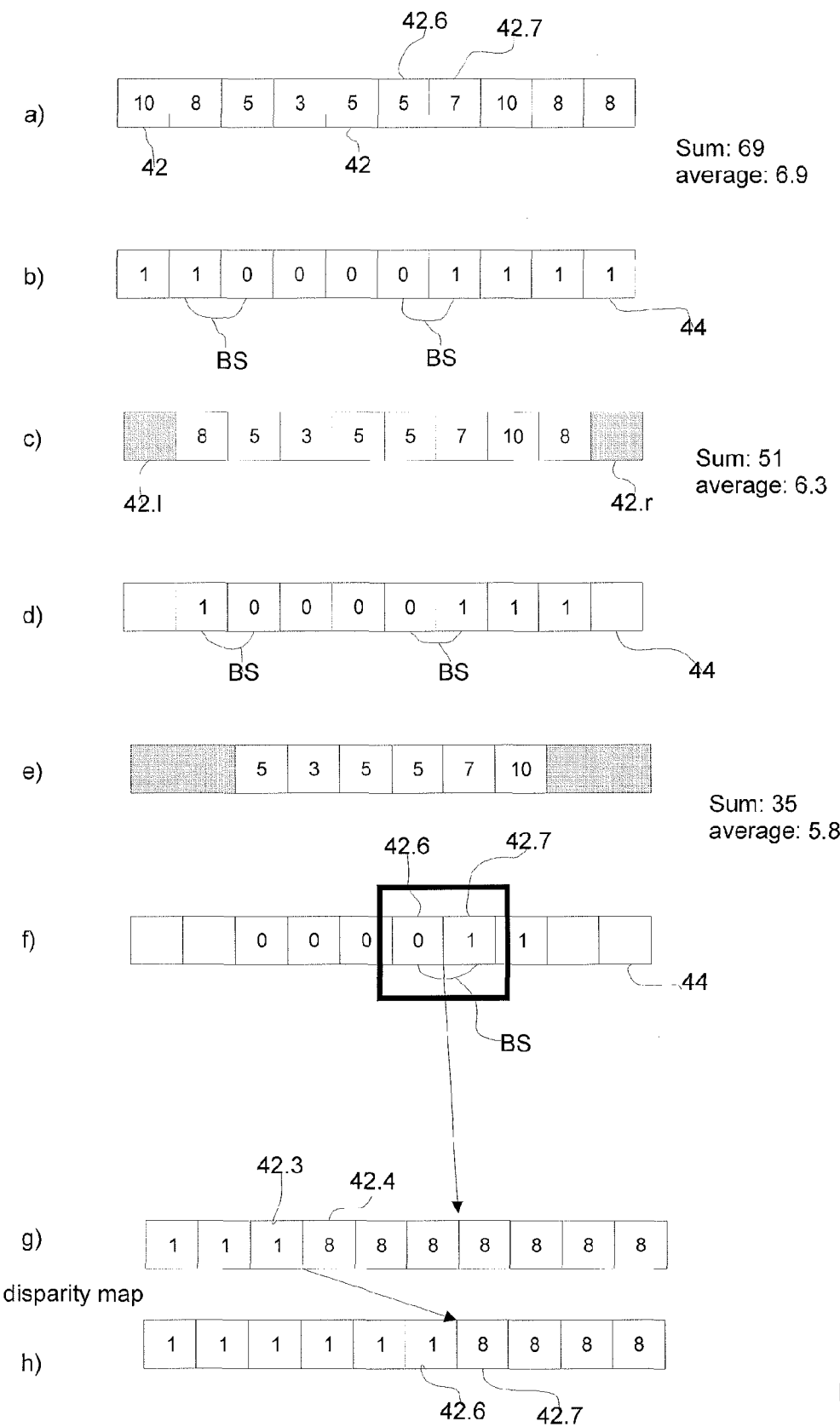
FIG. 4 shows rows of pixel values and binarized values to illustrate the method.

The filtered image, particularly the filtered image region around the mark 38 is then supplied to the binarization step 18, which will now be explained in more detail with reference to FIG. 2 and FIG. 4.

In the filtered image region, an image area around the mark 38 is selected. Preferably, the area is a row of pixels around the mark 38. The maximum number of pixels in the selected area is predefined and used throughout the method. Beside the maximum number of pixels there is also a minimum number of pixels the selected area should have which is also predefined.

It is also conceivable that the selected area is a two dimensional area of pixels, hence in X and Y direction. However, in the following a one dimensional area is used.

In FIG. 4a a selected area of pixels, namely e.g. ten pixels, is shown. Each pixel 42 is characterized by a value which could be an R, G or B value of the image or any combination thereof or any other value of the respective used color space, for example YUV, etc. Just for illustration purposes, the values used in FIG. 4a range only from three to ten.

The step of selecting an area around the mark 38 is indicated by reference numeral 52 in FIG. 2.

In the next step, the average value of the pixel values is calculated. The pixel values of the selected area shown in FIG. 4a is 6.9 with a sum of 69.

This calculating step is indicated by reference numeral 54.

In the next step 56, each pixel value 42 is compared with the calculated average and the result of the comparison is stored in a binarized or binary map 44. The binary map 44 contains a binary value for each pixel value. If the pixel value 42 is below the average, the binary value is set to "0" and if the pixel value is above the average, the binary value is set to "1".

The result of the comparison is shown in the binary map 44 in FIG. 4b.

The step of generating the binary map 44 is indicated by reference numeral 58 in FIG. 2.

In the next step 60 the binary map 44 is analyzed and it is determined whether there is only a single binary step or more than one binary step. A binary step is a value change between "1" and "0" between two adjacent pixels in the binary map 44.

In the present example, the binary map 44 in FIG. 4*b* comprises two binary steps indicated by the letters BS.

The binary map 44 comprising two binary steps BS is therefore classified as not well defined so that the process of selecting an area, calculating an average value and generating a binary map has to be repeated, however, now with a reduced area size.

In step 62, the selected area of pixels 52 is reduced by a number of pixels, in the present example 1 pixel, at both edges of the selected area. That is in other words, the left and the right pixel 42L and 42R at the left and the right edge are dropped.

In the next step 54, the sum of the reduced area and the average are calculated. In the present example, the sum is 51 and the average 6.3.

Next, the pixels of the reduced area are compared with the average and on the basis of this comparison, the binary map 44 is generated, now also with a reduced size.

In step 60, it is again determined that the binary map 44 contains two binary steps BS so that this binary map is again classified as "not well defined".

The iterative process starts again with step 62 which reduces the selected area by further pixels at the edges so that the reduced selected area now comprises only six pixels.

The reduced area is then applied to the summing and averaging step and then to the comparing step 56. The result of step 58 is shown in FIG. 4*f*.

It is now apparent that the binary map 44 comprises only a single binary step BS so that in step 60, the binary map 44 is classified as "well defined".

This means in other words that there is a step between the associated pixels which are indicated by reference numerals 42.6 and 42.7 in the pixel area shown in FIG. 4*a*.

Hence this iterative process has revealed that there is a change from pixel 42.6 to pixel 42.7 which indicates with a very high likelihood the boundary of the object.

In response to this result, the disparity map, particularly the respective area, can be adjusted or refined. For example, if the boundary of the object in the disparity map is between pixels 42.3 and 42.4, as shown in FIG. 4*g*, this boundary is shifted to the pixels 42.6 and 42.7.

In order to refine also the next rows of the disparity map along the mark 38, the above-described process is run again with a new image area, for example the next pixel row along the mark 38.

This process is run as long as there is still a further area along the mark 38. In other words, the refinement process is completed if all image areas along the mark 38 have been processed. As a result, the disparity estimation map has been refined along the mark 38.

As mentioned above, in step 60 it is checked whether the binary map is "well defined" or not. However, there is a further criterium which is checked, namely the size of the binary map. If the binary map only comprises the minimum number of values, the iterative process is also terminated for the selected area, however, with the result that there is no well-defined boundary found. The respective area of the disparity map is therefore not adjusted in this case.

The above-mentioned process can be realized/implemented in hardware or software or a combination thereof. It is possible to implement certain steps in hardware and others in software. More preferably, the video image processing system comprises at least a circuit containing a microprocessor adapted to perform the directional filter step 16, the binarization step 18 and the disparity estimation refinement step 20.

To sum up, the present disclosure provides a method for refining a disparity estimation or a motion estimation map to achieve high quality although the user input marking the incorrect image regions is imprecise.

With the described method, the user is allowed to roughly mark the objects and the method will refine the inevitably imprecise user marks, aligning them to the object boundaries. The marks are used to iterate a directional Gaussian filter. The filtered area is binarized using for example DRC techniques. The binary map defines the object boundaries so that the vector field of the disparity estimation map or motion estimation map can be fitted to the object.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

Additionally, the present technology may also be configured as below.

(1) Method for refining a disparity/motion estimation map of an image at image regions a user has marked, including
Filtering said image along a mark set by the user
Binarizing said filtered image to generate a binarized map of the filtered image
Determining a binary step within said binarized map indicating a boundary of an object, and
Refining said disparity/motion estimation map on the basis of the determined binary step.

(2) Method according to (1), wherein binarizing said filtered image includes
Selecting an area of the image around the mark comprising a first number of pixels,
Calculating a threshold value on the basis of the first number of pixels, Generating said binary map associated with the first number of pixels and containing a binary "0" if the associated pixel value is below the threshold value and a binary "1" if the pixel value is above the threshold value.

(3) Method according to (2), wherein said threshold value is an average value of the first number of pixels.

(4) Method according to (2) or (3), wherein determining a binary step includes searching for a "0" to "1" or "1" to "0" value change in the binarized map and counting the found value changes.

(5) Method according to (4), including
if the count is greater than one, reducing the size of the selected area to a second number of pixels, and
repeating binarizing said filtered image and determining a binary step with the reduced area.

(6) Method according to (5) wherein the method is stopped if the size of the selected area is below a predetermined value.

(7) Method according to any of (1) to (6) wherein said binarized map is a one dimensional array.

(8) Method according to any of (1) to (6), wherein said binarized map is a two dimensional array.

(9) Method according to any of (2) to (8), including
Selecting a new area along the mark and
Repeating the method as long as there is a new area.

(10) Method according to any of (1) to (9), wherein filtering said image includes determining the direction of the user's mark.

(11). Method according to any of (1) to (10), wherein filtering said image includes applying a directional filter, preferably a directional Gaussian filter.

(12) Method according to any of (1) to (11), wherein refining said disparity map includes
Adjusting the disparity/motion estimation map in correspondence to the position of the binary step indicating a boundary of an object.

(13) Method according to any of (1) to (12), wherein a single video colour channel of the image is used.

(14) Method according to any of (1) to (12), wherein multiple colour channels of the image are used either combined together or separately.

(15) Method according to (1) to (14), wherein said method is part of an offline video processing.

(16) Method according to (2) to (15), wherein said selected area is a one dimensional area including a row of pixels.

(17) Method according to (2) to (15), wherein said selected area is a two dimensional area including at least two rows of pixels.

(18) Video post-processing system for refining a disparity/motion estimation map of an image at image regions a user has marked, including
a disparity/motion estimator generating a disparity or motion estimation map on the basis of a first image and a second image
a user interface adapted to mark regions in the image for disparity refinement
a filter receiving said 3D image for filtering said image along said marked region,
a binarizing unit receiving said filter image and generating a binarized map,
a binary step determining unit receiving said binarized map and deter-mining a binary step within said map, and
a disparity map refinement unit adjusting said disparity map in correspondence with said determined binary step.

(19) A computer program including program code means for causing a computer to perform the steps of said method as described in (1) when said computer program is carried out on a computer.

(20) A non-transitory computer-readable recording medium that stores therein a computer program product, which, when executed by a processor, causes the method according to (1) to be performed.

The present application claims priority to European Patent Application 12 179 890.4, filed in the European Patent Office on Aug. 9, 2012, the entire contents of which being incorporated herein by reference.

Any reference signs in the claims should not be construed as limiting the scope.

The invention claimed is:

1. A method for refining a disparity/motion estimation map of an image at image regions a user has marked, comprising
filtering said image along a mark set by the user;
binarizing said filtered image to generate a binarized map of the filtered image;
determining a binary step within said binarized map indicating a boundary of an object, the determining the binary step includes determining a "0" to "1" or "1" to "0" value change in said binarized map; and
refining said disparity/motion estimation map based on the determined binary step, wherein said binarizing said filtered image comprises:
selecting an area of the image around the mark comprising a first number of pixels,
calculating a threshold value based on the first number of pixels, and
generating said binarized map associated with the first number of pixels and containing a binary "0" if an associated pixel value is below the threshold value and a binary "1" if the associated pixel value is above the threshold value.

2. The method of claim 1, wherein said threshold value is an average value of the first number of pixels.

3. The method of claim 1, further comprising counting a number of value changes from "0" to "1" or "1" to "0" in said binarized map.

4. The method of claim 3, further comprising:
if the number of value changes is greater than one, reducing a size of the selected area to a second number of pixels, and
repeating said binarizing said filtered image and determining a binary step within the reduced area.

5. The method of claim 4, wherein the method is stopped if the size of the selected area is below a predetermined value.

6. The method of claim 1, wherein said binarized map is a one dimensional array.

7. The method of claim 1, wherein said binarized map is a two dimensional array.

8. The method of claim 1, further comprising:
selecting a new area along the mark; and
repeating the method as long as there is a new area.

9. The method of claim 1, wherein said filtering said image comprises determining a direction of the user's mark.

10. The method of claim 1, wherein said filtering said image comprises applying a directional Gaussian filter.

11. The method of claim 1, wherein said refining said disparity/motion estimation map comprises:
adjusting the disparity/motion estimation map in correspondence to a position of the binary step indicating the boundary of the object.

12. The method of claim 1, wherein a single video color channel of the image is used.

13. The method of claim 1, wherein multiple channels of the image are used either combined together or separately.

14. The method of claim 1, wherein said method is part of an offline video processing.

15. The method of claim 1, wherein said selected area is a one dimensional area comprising a row of pixels.

16. The method of claim 1, wherein said selected area is a two dimensional area comprising at least two rows of pixels.

17. A video post-processing system for refining a disparity/motion estimation map of an image at image regions a user has marked, comprising:
circuitry configured to:
filter said image along a mark set by the user;
binarize said filtered image to generate a binarized map of the filtered image;
determine a binary step within said binarized map by determining a "0" to "1" or "1" to "0" value change in said binarized map; and
refine said disparity/motion estimation map in correspondence with said determined binary step,
wherein the circuitry is configured to binarize said filtered image by:
selecting an area of the image around the mark comprising a first number of pixels,
calculating a threshold value based on the first number of pixels, and
generating said binarized map associated with the first number of pixels and containing a binary "0" if an associated pixel value is below the threshold value and a binary "1" if the associated pixel value is above the threshold value.

18. The video post-processing system of claim 17, further comprising a user interface to mark regions in the image for disparity refinement.

19. A non-transitory computer-readable recording medium that stores therein a computer program product, which, when executed by a processor, causes the processor to perform a method comprising
filtering said image along a mark set by the user;
binarizing said filtered image to generate a binarized map of the filtered image;
determining a binary step within said binarized map indicating a boundary of an object, the determining the binary step includes determining a "0" to "1" or "1" to "0" value change in said binarized map; and
refining said disparity/motion estimation map based on the determined binary step,
wherein said binarizing said filtered image comprises:
selecting an area of the image around the mark comprising a first number of pixels,
calculating a threshold value based on the first number of pixels, and
generating said binarized map associated with the first number of pixels and containing a binary "0" if an associated pixel value is below the threshold value and a binary "1" if the associated pixel value is above the threshold value.

* * * * *